G. Craine,
Sawing Shingles,
N° 19,349.
Patented Feb. 16, 1858.
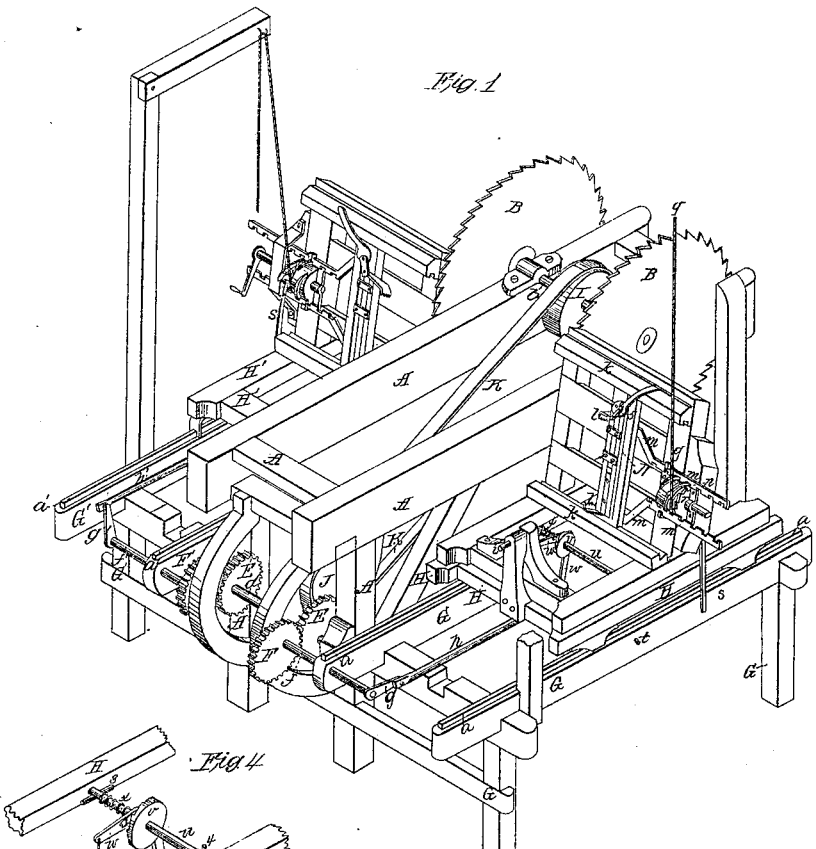
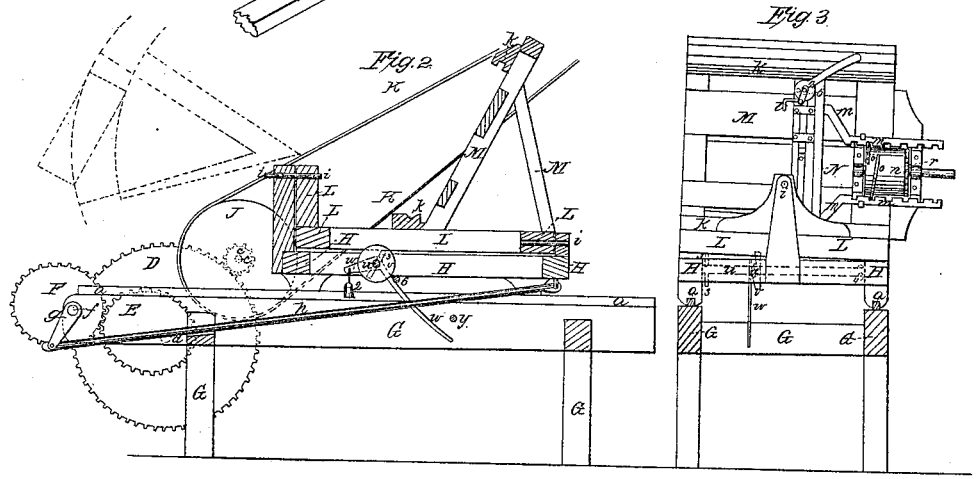

UNITED STATES PATENT OFFICE.

GEORGE CRAINE, OF FAIRFIELD, IOWA.

SHINGLE-MACHINE.

Specification of Letters Patent No. 19,349, dated February 16, 1858.

*To all whom it may concern:*

Be it known that I, GEORGE CRAINE, of Fairfield, in the county of Jefferson and State of Iowa, have invented certain new and useful Improvements in Shingle-Machines; and I do hereby declare the following to be a full, clear, and exact description of the construction and operation of the same, reference being had to the accompanying drawings, making a part of this specification, in which—

Figure 1, represents a perspective view, Fig. 2, represents a longitudinal vertical section, Fig. 3, represents a transverse vertical section, Fig. 4, represents in perspective the device for rocking the carriage.

Similar letters of reference where they occur in the several figures, denote like parts of the machine in all of them.

My invention relates to the operation of the carriage, or carriages that carry the bolts to the saws—the feeding up of the bolt, and the shifting of it, to form the butt and point from alternate ends thereof, being done automatically.

To enable others skilled in the art to make and use my invention, I will proceed to describe the same with reference to the drawings.

A represents a central main frame for supporting the saws B, B, at one of its ends, and the gearing C, D, E, E', F, F', with their respective shafts and connections, as will be hereafter more particularly described.

G, G', are side frames, connected to the main frame A, and furnished with ways *a, a'* upon which the carriages H, H', respectively traverse.

Motion is communicated to the shaft *b*, that carries the two saws B, B, from any first mover. On the shaft *b*, is a pulley or drum I, around which and around another pulley J, on a shaft *c*, at the other end of the machine or frame, passes an endless belt or band K, which gives motion to said shaft *c*. The shaft *c*, carries a pinion C, which gears with and gives motion to a gear wheel D, on a shaft *d*, suitably supported in the main frame; and this shaft *d*, has at or near each of its ends an elliptical cogged wheel E, E', which gear with and turn two other elliptical cog wheels F, F', respectively, on the shafts *f, f'*. The object of the elliptical wheels, is to cause the carriages H, H', when they are feeding up the bolt to the saw, to run at less speed than when returning the carriage for the next operation, thus economizing time, and allowing the saws to run at a uniform speed all the time.

On the ends of the shafts *f, f'*, are cranks *g, g'* to which the pitmen *h, h'*, are connected by one of their ends the other ends being attached respectively to the carriages H, H', to traverse them to and from the saws. The motions of these carriages are so arranged, that as the length of the kerf of one saw increases, the kerf of the other saw shall diminish and vice versa. This causes the saws to be regulators to each other, making the sum of the resistance of both about equal to that of either one when it is cutting its longest kerf, or working in the greatest arc which it makes in the bolt of wood. The red and blue lines to the left of Fig. 2, will illustrate this idea—the red line representing the position of one saw in its block and the blue line the other saw in its block—the first at its greatest kerf—the other just entering upon its kerf. By the time that the saw represented in red, reaches the extreme left hand corner of the block—the other saw (in blue) will have arrived where the red one is now, and so on, one leading the other just enough to effect this purpose. To the carriage H, is pivoted, by bolts or pins *i, i*; a cradle frame L, on which is arranged a support M, inclined as shown in Fig. 2. At the top and bottom of this support M, are arranged two grooved ways *k, k* in which a cross head N, carrying the dogs *l, l*, moves. Attached to this cross head N, are two rack pieces *m, m*, and between them a drum *m*, having on a portion of its perimeter a worm or screw thread *o*, that takes into said racks, and thus as it rotates periodically, driving the crosshead with its bolt or block toward the saw.

Around the drum *n*, is a cord *q*, which extends up over a pulley, and thence down again and having a falling weight attached to its end. There is also a ratchet *r* attached to this drum *n*, into which a pawl, pivoted to a hinged lever *s*, catches to prevent the falling weight from rotating said drum except at proper intervals. As the cariage H, traverses, the lever *s* strikes the pin *t*, which throws out the pawl, and then the falling weight rotates the drum *n*, and feeds up the bolt to the saw.

The butts and points of the shingles are alternated as follows: A shaft *u* (Fig. 4) is hung in the carriage H, and on this shaft is a face ratchet $v$, against which a dog 1, on the bell crank lever $w$, is forced by the coiled spring $x$ on said shaft $u$. There is a weight 2 attached to one arm of the lever $w$ (see Fig. 2), and the other arm strikes against a stud pin $y$ in the frame G, which gives the shaft $u$, a semi-rotation, and brings the pins 3, 4, (which pass through said shaft at right angles to each other), against the rails of the cradle L, alternately, and rocks it on its pivots $i$, $i$, and thus by rocking the cradle L, alternately one way and then the reverse the butts and points are alternated from one end of the bolt to the other. The dogs $l$, $l$, are driven into and drawn out of the bolt by the cam levers $z$, and the strap connection 5. The rod 6 Fig. 2, catches the pawl lever $w$, and prevents it from swinging so far out of its necessary sweep, as would otherwise prevent the pin $y$, from operating it at the proper time.

Having thus fully described the nature the object of my invention, what I claim therein as new and desire to secure by Letters Patent is,

1. In combination with the pivoted reciprocating cradle L the pawl-lever $w$, ratchet $v$ and its shaft $u$ for tilting said cradle alternately from one side to the other to form the butts and points of the shingles, substantially as described.

2. I also claim in combination with the reciprocating carriage, the device for giving to it a slow forward motion, and a quick backward motion, viz: the elliptical spur gears E, F with their shafts, cranks, and connecting rods, as herein set forth and represented.

3. I also claim so arranging the two carriages and two saws, as that one shall serve as a check balance, or governor to the other and vice versa, by making the sum of the forces of the two saws when sawing to conform to that of one of them when it alone is sawing, the compensation being effected by the comparative length of the kerfs that each, or the single saw may be cutting as set forth.

GEORGE CRAINE.

Witnesses:
   A. B. Stoughton,
   C. Cohen.